May 2, 1933.　　　　G. C. THOMAS, JR　　　1,906,669
CONDUIT BOX
Original Filed July 24, 1929
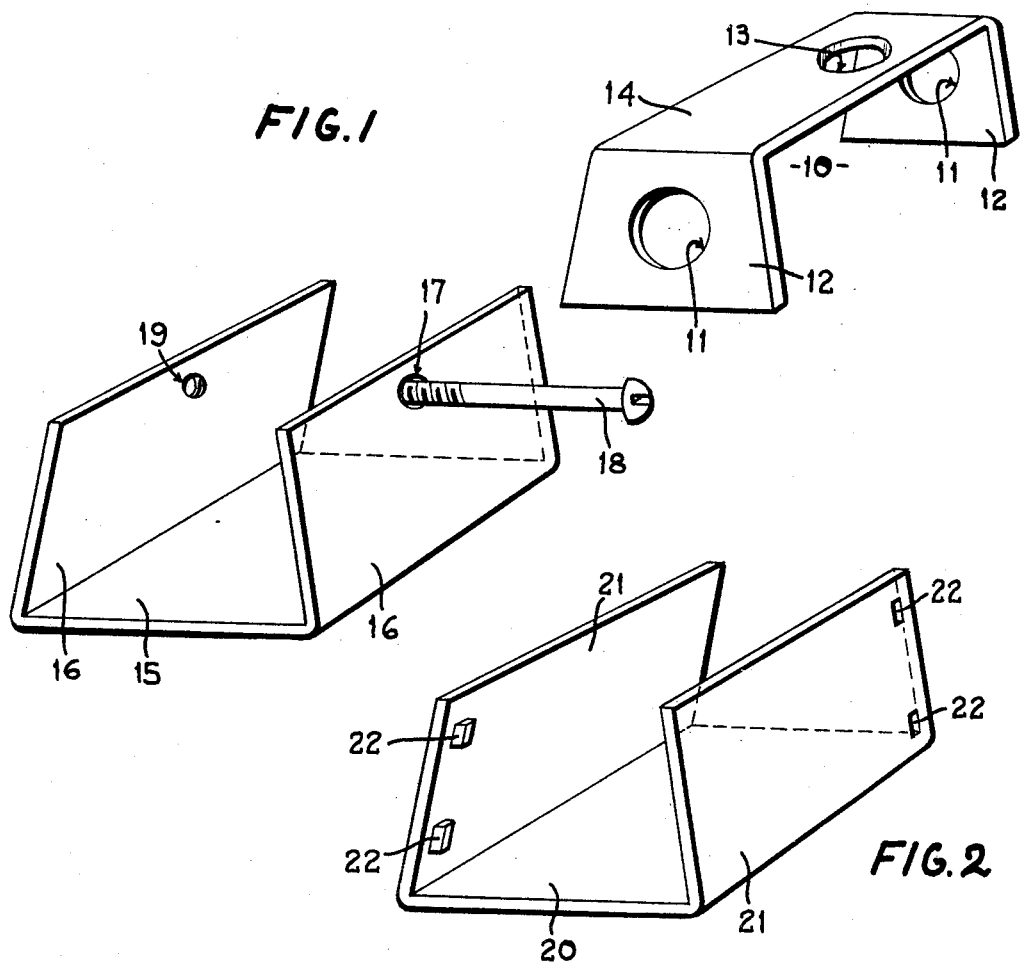
FIG.1
FIG.2
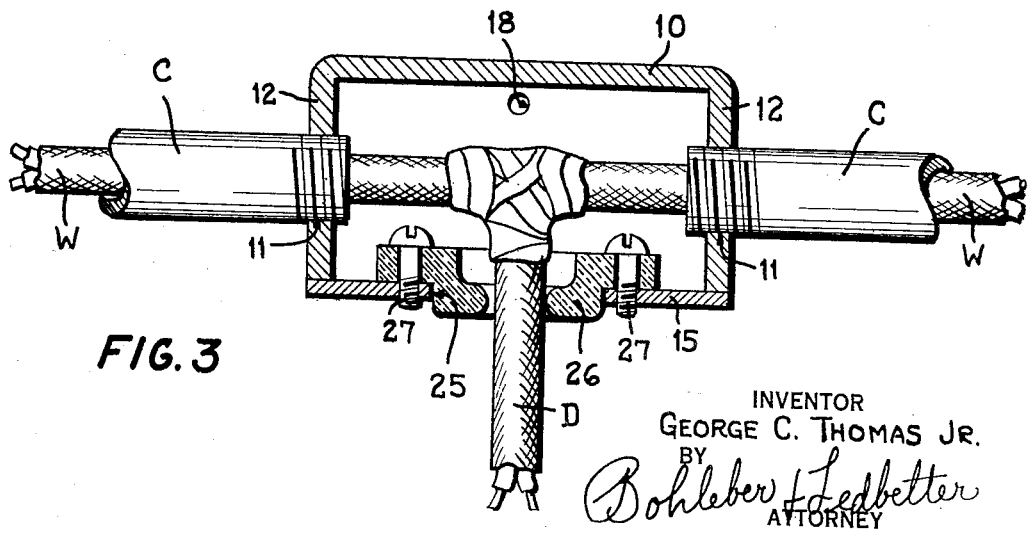
FIG.3
INVENTOR
GEORGE C. THOMAS JR.
BY
Bohleber Ledbetter
ATTORNEY Patented May 2, 1933

1,906,669

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CONDUIT BOX

Original application filed July 24, 1929, Serial No. 380,489. Divided and this application filed November 2, 1932. Serial No. 640,809.

The invention relates to conduit boxes, such as are used for electrical wiring, and may be used for any purpose for which an outlet or junction box or even an elbow with removable cover may be used. Conduit boxes are customarily formed of a single piece of metal which is cast or punched from sheet metal so that the bottom and the four or more sides of the box comprise a single piece with one side of the box being open. The open side of the box is closed by a flat plate secured upon the box by screws or other securing means.

This application is a division of my application Serial No. 380,489, filed July 24, 1929.

The box to be described herein is constructed of two U-shaped pieces which are assembled together to form a box which has six sides and thereby completely enclosing the wires which are carried to the box. The wires may be spliced within the box or may be spliced to drop cords or extensions as desired. Any type of connection may be made from the box, such as a connection for a drop light in which the wire to the light passes through an opening in one side of the box, or a lighting fixture may be secured directly to the box and wiring connection made thereto. Upon removal of the cover of the box, three sides thereof are exposed for splicing or running wires through the conduit to the box or any other necessary operation in connection with electrical wiring.
It is an object of the invention to construct a conduit box which is made in two U-shaped parts or having two U-shaped members, each of which parts comprise, respectively, three of the six sides of the completely enclosed conduit box. One of the U-shaped parts or members has its sides tapering inwardly at their outer ends to form a wedge-shaped structure which is retained in position upon the other U-shaped member through the cooperating wedge-shaped ends upon the latter member.

Other objects of the invention will be more apparent from the following description, taken in connection with the accompanying drawing showing the preferred embodiments of the invention, in which:

Figure 1 is a perspective view of the two U-shaped parts or members of the box with one of the members ready to be slipped upon the other and retained there by the wedge-shaped form of the members and a clamping screw ready to be inserted to hold the parts securely together against separation.

Figure 2 is a perspective view of another form of a three sided member or cover in which a clamping screw is not used to secure the parts together.

Figure 3 is a cross-section through the conduit box with the conduit secured thereto and a drop cord for a drop light spliced to the wires passing through the conduit and box.

The conduit box of this invention utilizes a U-shaped part or member which provides three sides of the conduit box. This member preferably is of heavy material so that it forms a rigid support for conduit secured thereto. The ends of this U-shaped part are wedge-shaped so that the narrow portion of the wedge-shaped ends is at the connecting portion of the U. The other part or cover of the box is U-shaped and has a wedge-shaped cross-section so that it may be slid endwise upon the first portion and retained in position by the cooperating wedge-shaped cross-section of the cover member and the wedge-shaped ends of the other member. The cover is relatively thin and flexible so that if desired it may be snapped over the wedge-shaped ends of the rigid member and retained in position by the wedge-shaped form of the ends of the rigid member and the wedge-shaped cross-section of the flexible member or cover. A screw may be utilized to securely clamp the two members together. The two U-shaped members preferably are punched from sheet material and bent into the U-shaped form. The box therefore lends itself to this economical method of manufacture.

The conduit box includes a rigid member, designated generally as 10, of relatively thick material and bent into a U-shaped member to form one side and two ends 12 of the conduit box. The thick material is rigid enough to rigidly support conduit C, shown in Figure 3, within the openings 11 in the ends 12 of the U-shaped member. The box may also be provided with another conduit opening 13 on the connecting portion 14 of the U-shaped member which connects the ends 12 together. It is obvious that either the opening 13 or one of the end openings 11 may be dispensed with if desired. The ends 12 of the rigid member 10 are wedge-shaped or tapered with the narrow portion of the taper at the connecting portion 14 of the U which connects the ends 12 together. The wide portion of the wedge therefore is at the outermost extremities of the ends 12.

The remainder of the box comprises a second U-shaped member or cover 15 of relatively thin material so that it will be flexible and may be sprung over the wedge-shaped ends 12 if necessary to be assembled therewith in this manner. The cover otherwise need not be flexible. The cover 15 provides the remaining three sides of the box so that when it is assembled with the rigid member 10, a completely enclosed six sided box is formed. The sides 16 of the U-shaped cover 15 have their outermost ends bent inwardly so that a cross-section through the cover member is wedge-shaped or tapered with the outer extremities of the sides 16 being the narrow portion of the taper or wedge-shaped cross-section.

One side 16 of the flexible part 15 has a hole 17 through which a clamping screw 18 is freely received. The other side 16 of the flexible cover 15 has a threaded opening 19 into which the clamping screw 18 is threaded to draw the sides 16 together and clamp the sides against the wedge-shaped ends 12 and the edges of the connecting portion 14 of the rigid member 10.

It may be desirable to have a flexible cover which is snapped into position upon the rigid member 10 and is retained thereupon by the cooperating wedge-shaped or tapering portions of the two members. The cover is then prevented from sliding longitudinally of the rigid part by projections to be described. Such a flexible member 20 is shown in Figure 2. This flexible member 20 is U-shaped and forms three sides of a completely enclosed conduit box when positioned upon the rigid member 10. The flexible member or cover 20 is wedge-shaped in cross-section to cooperate with the wedge shaped ends 12 of the rigid member 10 as in the construction of Figure 1. The flexible cover of the box, shown in Figure 2, differs from that shown in Figure 1 in that the sides 21 are provided with at least one projection 22 upon the inner surface of each side and spaced from the end of the flexible cover 20 a distance corresponding to the thickness of the ends 12 of the rigid member 10. The projection or projections 22 are provided at least at one end of each of the sides 21.

The flexible member or cover 20 of Figure 2 is assembled upon the rigid member 10 of Figure 1 by flexibly spreading apart the outer extremities of the sides 21 so that these extremities will slip over the wide portions of the wedge-shaped or tapered ends 12. The sides 21 then snap or flex together to retain the flexible cover 20 upon the rigid part 10 because of the wedge-shaped character of the ends 12 and the normal wedge-shaped cross-section of the flexible member 20. The projections 22 abut against the inner edges of the ends 12 of the rigid member 10 and thereby prevent longitudinal movement or displacement of the flexible cover 20 relatively to the rigid member 10. The flexible cover 20 is therefore held against removal from the rigid member 10 excepting when the flexible sides 21 are pried apart sufficiently to enable the sides 21 to pass over the wide outer extremities of the wedge-shaped ends 12.

Ordinarily the conduit box shown in Figures 1 and 2 may be used to connect together the ends of two conduits C which may be in axial alignment, in which case the openings 11 in the ends 12 receive the conduit ends. The conduits C may extend at right angles to each other in which case one of the conduits is secured or threaded into one of the end openings 11 and the other conduit may be secured or threaded into the opening 13 in the rigid part 10. The conduit box then provides a point where the wires may be spliced together within the box, or provides an elbow with a removable cover in which the conduit ends are easily accessible for the threading of wires through the conduit.

The box may also be utilized as a point from which a drop light may be extended or as a lighting fixture support, the fixture being secured to the box. In Figure 3 the flexible cover 15 is shown with an opening 25 therethrough in which is inserted an insulating member 26. The insulating member is held in position by screws 27 threaded into the flexible cover 15. The conduits C are secured within the openings 11 of the box by being threaded into the openings. The wires W then extend through the conduit and are spliced to a drop cord D which extends down through the insulating member 26. The drop cord D may carry a light, plug or other device at its lower end. Obviously, the insulating member 26 may be substituted by a lighting fixture which is connected with the wires W through a wire connection spliced within the box.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing, except as indicated in the appended claims.

What is claimed is:

1. A conduit box comprising a rigid U-shaped member forming three sides of the box in which the sides of the box forming the arms of the U are tapered outwardly, and a flexible U-shaped member forming the remaining three sides of the box, in which the sides of the box forming the arms of the U are bent inwardly for locking engagement with the rigid member.

2. A conduit box comprising a rigid U-shaped member forming three sides of the box in which the sides of the box forming the arms of the U are tapered outwardly, a flexible U-shaped member forming the remaining three sides of the box, and means to clamp the members together.

3. A conduit box comprising a rigid U-shaped member forming three sides of the box in which the sides of the box forming the arms of the U are tapered outwardly, a flexible U-shaped member forming the remaining three sides of the box, and a screw to contract the flexible member to clamp its sides to the rigid member.

In testimony whereof I affix my signature.

GEORGE C. THOMAS, Jr.